United States Patent [19]

Sakakibara

[11] Patent Number: 4,901,915
[45] Date of Patent: Feb. 20, 1990

[54] CONTROL APPARATUS FOR WATER TEMPERATURE AND WATER FLOW RATE

[75] Inventor: Shigeru Sakakibara, Aichi, Japan

[73] Assignee: Inax Corporation, Tokoname, Japan

[21] Appl. No.: 235,545

[22] Filed: Aug. 24, 1988

[30] Foreign Application Priority Data

Aug. 31, 1987 [JP] Japan .................. 62-132659[U]

[51] Int. Cl.$^4$ ............................................ G05D 23/13
[52] U.S. Cl. .............................. 236/12.12; 236/46 F
[58] Field of Search .................. 236/12.12.12.11, 12.1, 236/46 R, 46 F, 46 C; 137/624.11, 624.12

[56] References Cited

U.S. PATENT DOCUMENTS 4,682,728 7/1987 Oudenhoven et al. .......... 236/12.12
4,696,428 9/1987 Skakalis ............................. 236/12.12

Primary Examiner—Harry B. Tanner
Attorney, Agent, or Firm—Arnold, White & Durkee

[57] ABSTRACT

A control apparatus for water temperature and water flow rate includes a mixing valve adapted to be supplied with hot water and cold water from a hot water source and a cold water source, respectively, and delivers mixed water. In addition, the control apparatus includes a flow rate controller disposed to a system for delivering the mixed water from the mixing valve to a place where it is required and a controller for operating the mixing valve and the flow rate controller. This controller includes: a switch for discharging water and stopping the discharge of water, a setter for the water flow rate and the water temperature of the mixed water, a standard value memory for storing the standard water temperature and the standard water flow rate of the mixed water, a selected value memory for storing the water temperature and the water flow rate selected by the setter, a timer which is started upon a water stopping operating of the switch, and a signal selection that outputs an operation amount signal based on slected values when the water discharge operation is made before the elapse of a predetermined amount of time after the water stopping operation to the mixing valve and to the flow rate control, and operation among signals based on the standard values when the water discharging operation is made after the elapse of a predetermined amount of time after the water stopping operation to the mixing valve and the flow rate control.

6 Claims, 4 Drawing Sheets

CONTROL APPARATUS FOR WATER TEMPERATURE AND WATER FLOW RATE

FIELD OF THE INVENTION AND RELATED ART STATEMENT

The present invention concerns an apparatus for controlling the temperature and the flow rate of water to be supplied to showers, kitchens, washstands, bath tubs, etc. More specifically, it relates to a control apparatus for water temperature and water flow rate having an improved system for controlling the water temperature and the water flow rate upon starting the discharge of water again after temporal stopping.

As a control means for the water temperature and the water flow rate, of a shower for example a manual mixing valve has hitherto been used. However, control apparatus in which all of the adjustment for the water temperature and the water flow rate are conducted by switch operation has been used in recent years.

In the apparatus of this type, standard values for the water temperature and the water flow rate are stored and, upon pushing a water discharge switch, discharge of water is started at the water temperature and the water flow rate in accordance with the standard values. Further, control switches for the water temperature and the water flow rate are disposed to the control apparatus, so that the water temperature or the water flow rate can be controlled by operating the control switch.

In a conventional control apparatus for the water temperature and flow rate, even if the control switches have been set so that the water temperature and flow rate are as comfortable as possible (for example, to a shower user), the memory of the water temperature and flow rate initially set is lost after the flow of water has been stopped. This water is discharged when a user discharges water again for the water temperature and flow rate in accordance with the standard values. Accordingly, the water temperature and the water flow rate have to be set again.

It may be considered to store a selected water temperature and flow rate such that the discharge water will always be at a selected water temperature and flow rate when the water discharges again. In this case, however, if water is discharged under conditions selected a previous user, this water may be unexpectedly hot or cold or at an unexpectedly excessive flow rate making the user uncomfortable.

OBJECT AND THE SUMMARY OF THE INVENTION

The object of the present invention is to provide a control apparatus for the water temperature and water flow rate, capable of starting the discharge of water, even after the temporal stopping of water, again at the water temperature and the water flow rate which has previously been set to the desired temperature and flow rate for a user again.

Another object of the present invention is to provide a control apparatus for the water temperature and water flow rate, capable of starting the discharge of water at a standard water temperature and a standard water flow rate in the case where a long period of time has elapsed from the stopping of the discharge of water.

A further object of the present invention is to provide a means by which an apparatus for controlling the water temperature and water flow rate can be easily manipulated.

The control apparatus for water temperature and water flow rate according to the present invention comprises:

a mixing valve adapted to be supplied with hot water and cold water from a hot water source and a cold water source respectively, and deliver mixed water, a flow rate control means disposed to a system for delivering the mixed water from the mixing valve to a place where it is required; and a controller for operating the mixing valve and the flow rate control means; wherein said controller comprises: discharge of water, a setter for the water flow rate and the water temperature of the mixed water;

a standard value memory means for storing the standard water temperature and the standard water flow rate of the mixed water;

a selected value memory means for storing the water temperature and the water flow rate selected by the setter;

a timer started upon water stopping operation of the switch; and a signal selection means that outputs an operation amount signal based on selected values when the water discharge operation is made before the elapse of a predetermined amount of time after the water stopping operation to the mixing valve and to the flow rate control means, and operation amount signals based on the standard values when the water discharging operation is made after the elapse of a predetermined amount of time after the water stopping operation to the mixing valve and the flow rate control means.

The standard water temperature may be set to a temperature which most people find comfortable when they touch hot water upon taking a shower, etc. The standard water flow rate may be set to a flow rate that is most commonly used.

In the present invention, the controller may be constituted by using a microcomputer. A control program may be written into the ROM (read only memory) and those data, as for the water temperature and the water flow rate, can be stored in the RAM (random access memory) of the microcomputer. In the present invention, as the hot water source, those tanks storing hot water heated by an electrical heater, gas burner, petroleum burner, solar heat heater, etc. can be used. As a cold water source, those tanks storing water supplied from a water supply or wells can be used. The apparatus according to the present invention is preferably used for supplying hot water to those places requiring hot water such as a shower, kitchen, washstand, bath tub, etc.

In the control apparatus for water temperature and water flow rate according to the present invention, in a case where water discharge is started again within a predetermined amount of time after the water stopping operation, water is discharged again at the water temperature and the water flow rate just before the stop of the water. Accordingly, in the case when a user of a shower starts the water discharge again directly after the temporal water stopping, discharge of water is started again at a set water temperature and water flow rate.

Further, in the case if when a predetermined amount of time has elapsed after the stop of water, water is discharged again at the standard water temperature and the standard water flow rate upon conducting the water discharging operation. Accordingly, in the case of a person who uses a shower and then another person who uses the shower after the elapse of a predetermined amount of time, water is discharged again at the standard water temperature and the standard water flow rate.

According to the control apparatus for the water temperature and water flow rate according to the present invention, water is discharged again at the same water temperature and water flow rate as those upon stopping the water discharge in the case where a short time has elapsed from the stop of water discharge to the re-start of the water discharge. On the contrary, if a long time has elapsed from the stop of water discharge to the re-start of water discharge, water is discharged again at the standard water temperature and the standard water flow rate. Accordingly, after the water temperature and the water flow rate have been set to the desired conditions of a certain user while taking a shower and then the water has been stopped temporarily, water can be discharged again at the desired water temperature and the water flow rate upon starting the water discharge again.

On the other hand, in the case where a long period of time has elapsed from the stop of water to the restart of water discharge as in the case when a user discharges the shower water after the use of the shower by another, since the water discharge started at the standard water temperature and the standard water flow rate, the undesirable state that unexpectedly hot or cold water is discharged, or that an unexpectedly excessive amount of water is discharged can surely be prevented.

In the control apparatus, according to the present invention, there is no requirement for disposing a conventional temporal water stop switch, etc. and the operationability is extremely improved.

DETAILED EXPLANATION FOR THE PREFERRED EMBODIMENT

The present invention is to be described by way of its preferred embodiment with respect to the drawings.

Figure 1:
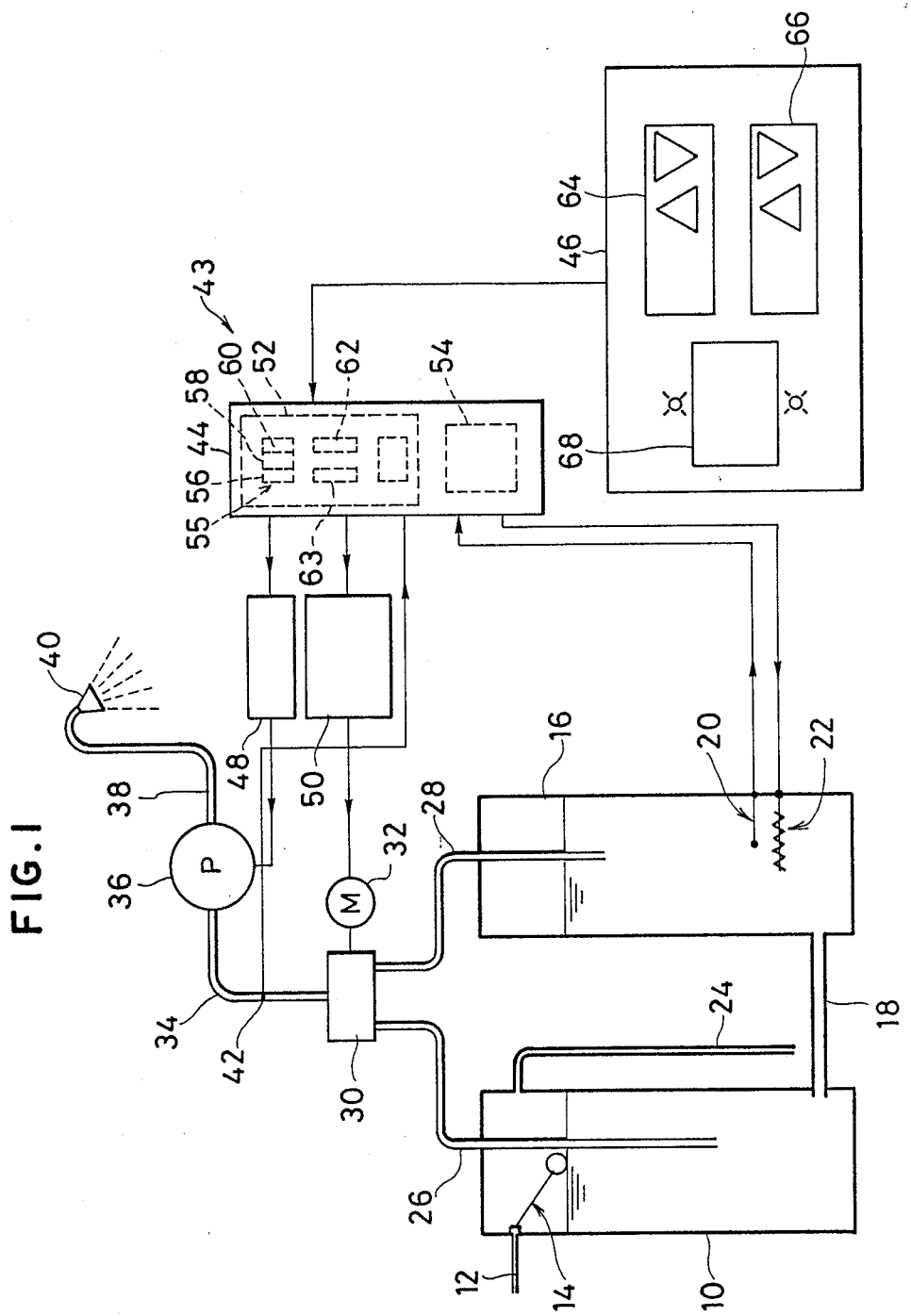
FIG. 1 is a systematic diagram illustrating the apparatus as one embodiment according to the present invention.

FIG. 1 is a systematic view illustrating one embodiment of the apparatus according to the prsent invention. Reference numeral 10 denotes a water tank which is connected with a tap water pipe 12 and adapted such that tap water can be supplied to a predetermined level by a ball tap 14. Reference numeral 16 denotes a hot water tank, which is in communication with the bottom of the water tank 10 by way of a pipe 18 and adapted such that the water level therein is the same as that in the water tank 10. The hot water tank 16 is provided with a temperature control sensor 20 and a water boiling heater 22. Further, the water tank 10 is connected with an overflow pipe 24.

The water tank 10 and the hot water tank 16 are connected with a mixing valve 30 by way of a water supply pipe 26 and a hot water supply pipe 28, and a driving motor 32 is attached to the mixing valve 30 for changing the mixing ratio between cold water and hot water.

At the exit of the mixing valve 30, a variable discharge flow rate pump 3 is connected by way of a pipe 34 and the discharge side of the pump 36 is connected by way of a pipe 38 to a shower head 40. A temperature sensor 42 for detecting the temperature of the mixed water is disposed to the pipe 34.

Reference numeral 43 denotes a controller for controlling the temperature and the flow rate of water and it comprises a controller main body 44, a switch panel 46, a voltage control circuit 48 and a motor driver circuit 50. The controller main body 44 has a control section 52 for water temperature and water flow rate and a control section 54 for the heater 22 in the hot water tank 16. The control section 52 for the water temperature and the water flow rate has a microcomputer 55, which comprises a ROM (read only memory) 56 for storing a control program, a RAM (random access memory) for temporarily storing the data, a CPU 60 for executing the processing and mathematical operation, as well as data bus, etc. for connecting them. Further, the water temperature and water flow rate control section 52 has an input device 62 and an output device 63. The input device 62 is inputted with signals from a water temperature switch (water temperature setter) 64, a water flow rate switch (water flow rate setter) 66 and a discharge water stop switch (ON/OFF switch) 68 on the switch panel 46, as well as the signal from the temperature sensor 42. The output device 63 delivers control signals to the voltage control circuit 48 and teh motor drive circuit 50.

The water temperature switch 64 outputs one shot of pulses on every pushing, for the left side thereof for elevating the water setting temperature, for example, by 1° C., by which the aimed water temperature, Ts, for the control is elevated by 1° C. Furthermore, the switch issues one shot of pulse on every pushing for the right side thereof, by which the aimed water temperature Ts for the control aim is lowered, for example, by 1° C., depending on the one shot of pulse.

Further, the water flow rate switch 66 changes the aimed water flow rate for control such that the flow rate of water discharged form the pump 36 is increased by a predetermined amount, for example, 0.5 l/min on every pushing for the right side thereof, while the flow rate of the water discharged form the pump 36 is decreased by a predetermined amount, for example, 0.5 l/min on every one pushing for the right side thereof.

The heater control section 54 constitutes a thermostat type control circuit different from that of the water temperature and water flow rate control section 52 and, it is so adapted that the temperature of water in the hot water tank 16 is always maintained at a set temperature (for example, 60° C.).

Figure 2:
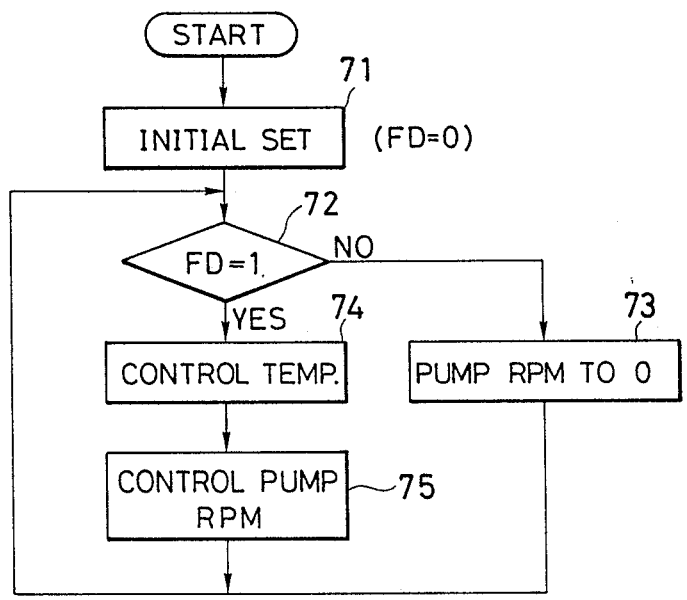
FIGS. 2, 3 and 4 are flow charts for explaining the control program
Figure 3:
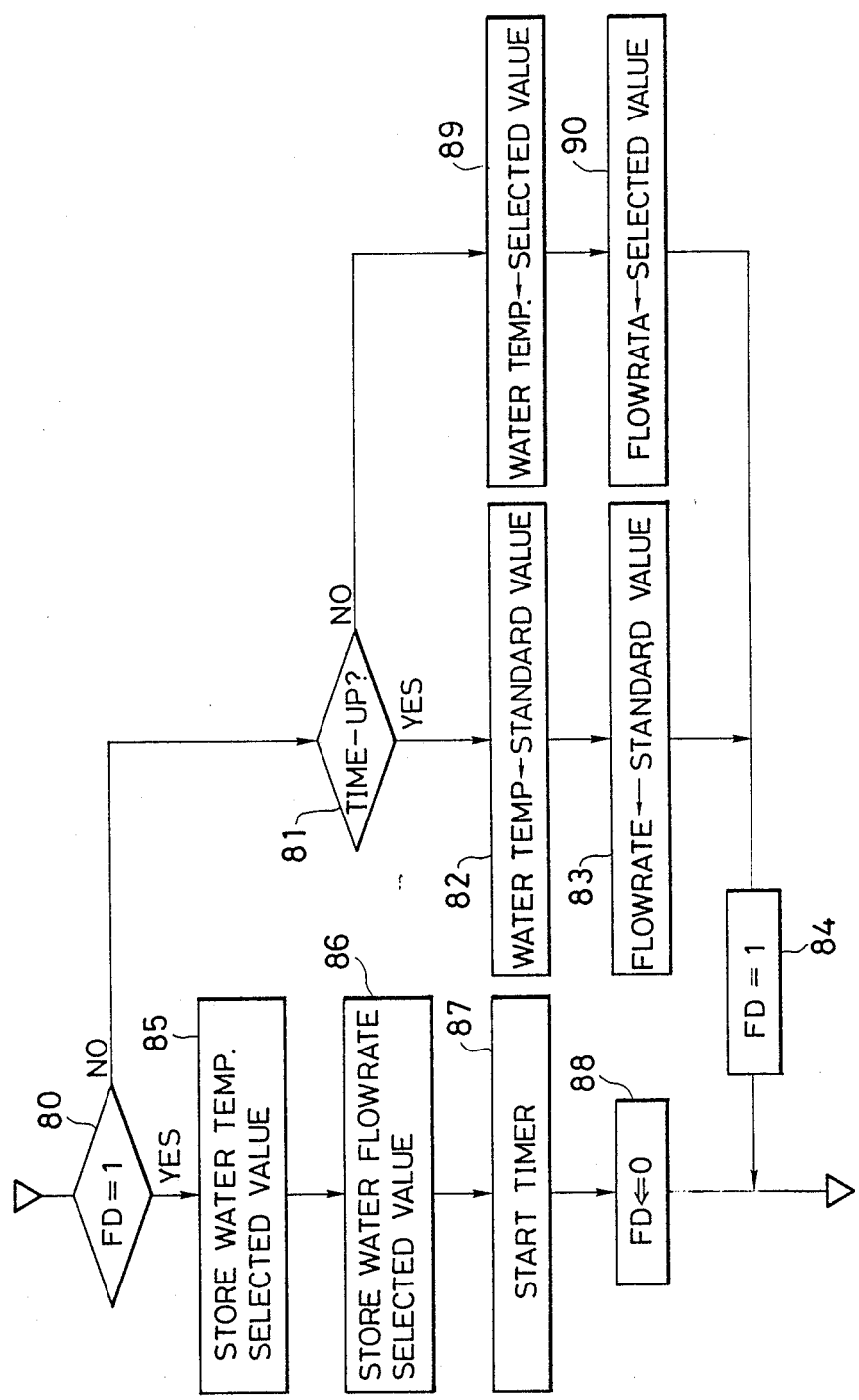
Figure 4:
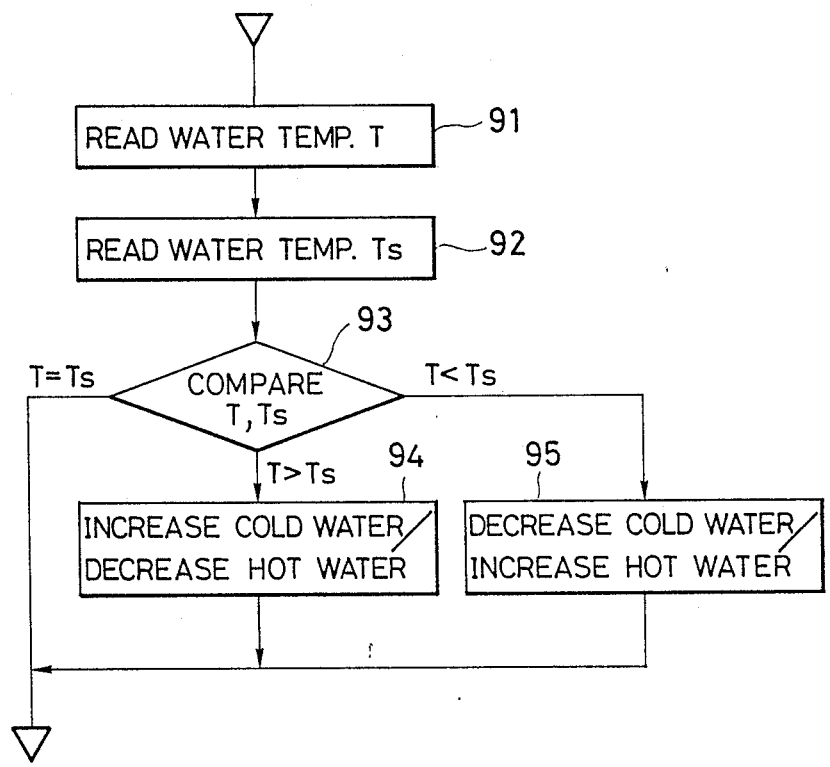

Then, explanation is to be made for the processing program stored in the ROM 56 while referring to FIG. 2 through FIG. 4. FIG. 2 shows a main routine, which is started by turning the power source for the controller 43 to ON. At first, the initial setting is made at the 71 and flag FD=0 is set. Then, it is judged as to whether FD=0 or 1 at step 72. Since FD=0 at the initial set condition, the flow advances to the step 73, to set the rotation of the pump 36 to 0 returns to the step 72. The processes in accordance with steps 72 and 73 are repeatedly executed to maintain the state until the water stop switch 68 is manipulated.

Then, when the water stop switch 68 is depressed for starting the discharge of water, an interrupt program as shown in FIG. 3 is executed. That is, it is first judged as to whether FD=0 or 1 at the step 80. Since this is the initial set state, FD=0 and the flow advances to step 81. Then, it is judged for the "time-up", that is, it is judged as to whether or not "a predetermined amount of time" has elapsed after the completion of the water discharging operation in the preceding cycle (water stop). The "predetermined amount of time" is set to, for example, between 3-10 minutes, although only used for the illustration. In this case, it is the initial set state and since the result of the judgement is YES, the flow advances to step 82. Then, a standard value is inputted to the aimed water temperature and flow rate for operation (step 83). Then, FD=1 is set at step 84 and the flow returns to the main routine shown in FIG. 2.

In the main routine, since FD=1 is set when step 72 is reached, the result of the judgement is YES, and the temperature control operation is conducted at step 74, the flow rate control is conducted at step 75 (control for the pump rotation) and returns again to the step 72. Then, the processes in accordance with steps 72, 74 and 75 are repeatedly executed until the water stop switch 68 is depressed again for stopping the water. In the course of executing the repeating procedures, if the switch 64 or 66 is pushed to select the water temperature or flow rate, the aimed water temperature for control and the aimed flow rate for control are respectively changed to the selected values, and the temperature control and the pump rotation control are conducted at steps 74 and 75 so as to attain the selected values.

FIG. 4 is a flow chart showing the program for the temperature control, which explains the content of step 74 specifically. At first, an actual water temperature, T, for the mixed waterd etected by the temperature sensor 42 is read at step 91. Then, the aimed water temperature, Ts, for control is read at step 92 and the actual water temperature, T, and the aimed water temperature, Ts, are compared at the step 93. If both of the water temperatures coincide each other, the temperature control operation is not conducted and the flow advances to step 75. In the case of when there is a difference between the actual water temperature, T, and the aimed water temperature, Ts, either the flow rate of cold water is increased and the flow rate of hot water is decreased to lower the temperature of the mixed water at step 94, or the flow rate of cold water is decreased and the flow rate of hot water is increased to elevate the temperature of the mixed water at step 95 and then the flow advances to the step 75.

Then, when the water stop switch 68 is pushed to conduct the water stopping operation in a state where water dischage (FD=1) is set, the interrupt program shown in FIG. 3 is executed in course of the processing the main routine shown in FIG. 2. That is, it is at first judged whether or not if at step 80 FD=1. Since the water has been discharged so far in this case, FD=1 and the flow advances to step 85 and 86 to memorize the selected water temperature and the water flow rate at present. Then, the timer is started (step 87), FD=0 is set (step 88) and then the flow returns to the main routine shown in FIG. 2. In the main routine, since FD=0 has been set, the flow advances from step 72 to step 73, where the rotation for the pump 36 is stopped, returns to step 72 and continues the pump stop state by repeatingly executing the steps of 72 and 73.

In this water stop state, when the water stop switch 68 is pushed again, the interrupt program shown in FIG. 3 is executed again. In this case, since FD=0, the flow advances from step 80 to step 81, where it is judged as to whether or not a predetermined amount of time has been elapsed from the start of the timer. If the predetermined amount of time has not yet elapsed, that is, the result of the time-up judgement is NO, the flow advances to step 89 and step 90, where the selected values stored as the aimed water temperature and water flow rate for control are inputted and, after setting FD=1 at the step 84, returns to the main routine. In the main routine, since FD=1, steps 72, 74 and 75 are repeatedly executed to discharge water in accordance with the selected water temperature and the flow rate.

On the otherhand, upon judging at step 81, if the predetermined amount of time (for example, 5 min) has already elapsed from the start of the timer, the result of the judgement for the time-up is YES and standard values are inputted, respectively, for the aimed water temperature and the flow rate (step 82, 83). Then, FD=1 is set at step 84 and the flow returns to the main routine. Accordingly, the water discharge is started again in this case with the water temperature and the flow rate both at the standard values.

As has been described above, according to the control program, the water temperature and water flow rate, upon re-starting the water, discharge before the elapse of a predetermined amount of time after the water stopping operation is the same as the water temperature and the water flow rate upon stopping of the water. Further, discharge of water is re-started at the standard water temperature and the standard water flow rate if it is started again after a elapse amount of the predetermined of time from the water stopping operation.

Although the pump 36 is used as a means for controlling the flow rate of water discharged in the above-mentioned embodiment, a flow rate control valve may be disposed instead of the pump 36 in the present invention. In this case, it is necessary that a water supply pressure is applied to the cold water tank and the hot water tank, respectively, toward the mixing valve 30. Further, in the present invention, cold water sources or hot water sources other than the water tank or the hot water tank may be used. Furthermore, the setting value changer may be disposed to the controller 43 for changing the "standard water temperature", "standard water flow rate" or "a predetermined of time" in the present invention.

What is claimed is:

1. A control apparatus for water temperature and water flow rate comprising:
   a mixing valve adapted to be supplied with hot water and cold water from a hot water source and a cold water source, respectively, and deliver mixed water;
   a flow rate control means disposed to a system for delivering the mixed water from said mixing valve to a place where it is required; and
   a controller for operating said mixing valve and said flow rate control means wherein
   said controller comprises: discharge of water;
   a setter for the water flow rate and the water temperature of the mixed water;
   a standard value memory means for storing the standard water temperature and the standard water flow rate of the mixed water;
   a selected value memory means for storing the water temperature and the water flow rate selected by said setter;

a timer which is started upon a water stopping operation of said switch; and a signal selection means that outputs an operation amount signal based on selected values when the water discharge operation is made before the elapse of a predetermined amount of time after the water stopping operation to the mixing valve and to the flow rate control means, and operation amount signals based on the standard values when the water discharging operation is made after the elapse of a predetermined amount of time after the water stopping operation to the mixing valve and the flow rate control means.

2. An apparatus as defined in claim 1, wherein the hot water source is a hot water tank provided with an electrical heater.

3. An apparatus as defined in claim 1, wherein the cold water source is a tank for storing tap water.

4. An apparatus as defined inclaim 1, wherein the flow rate control means is a variable discharge flow rate pump.

5. An apparatus as defined in claim 1, wherein the controller is provided with a microcomputer for storing a control program.

6. An apparatus as defined in claim 1, wherein the mixing valve is driven by a motor such that the mixing ratio of hot water to cold water is changed.

* * * * *